Aug. 11, 1964      G. R. DOUGLAS      3,143,890
RATE-OF-CHANGE DEVICE
Original Filed Nov. 30, 1956

WITNESSES
Robert C. Baird
George C. Thompson

INVENTOR
George R. Douglas.
BY
Paul C. Frieghmann
ATTORNEY

United States Patent Office 3,143,890
Patented Aug. 11, 1964

3,143,890
RATE-OF-CHANGE DEVICE
George R. Douglas, Pittsburgh, Pa., assignor to Westinghouse Electric Corporation, East Pittsburgh, Pa., a corporation of Pennsylvania
Continuation of application Ser. No. 625,547, Nov. 30, 1956. This application Mar. 16, 1961, Ser. No. 96,331
4 Claims. (Cl. 73—505)

This invention relates to a rate-of-change device and, more particularly, to a vibrating gyroscope capable of being used for measuring the rate of turn, pitch or yaw of an aircraft or other vehicle. The present application is a continuation of United States patent application Serial Number 625,547 filed Nov. 30, 1956, which will become abandoned.

Previous rate-of-change devices have generally been of the rotating type which are subject to errors due to friction in the bearings of the rotating member. The amount of error due to bearing friction becomes increasingly prevalent in the rotating gyro as the gyro ages and becomes subject to more and more wear. Since the exact amount of error in a rotating gyroscope cannot be predicted, the error becomes increasingly important in the operation of the system, the gyroscope is controlling.

It is, therefore, an object of this invention to provide a rate-of-change device of the vibrating type that is not subject to errors due to wear.

It is another object of this invention to provide a rate-of-change device of the vibrating type capable of substantially eliminating high frequency vibrations from the control output of the device.

It is another object of this invention to provide a rate-of-change device of the vibrating type having a motion reaction member resiliently mounted to substantially eliminate extraneous vibrations.

It is another object of this invention to provide a rate-of-change device of the vibrating type having a magnetic type damping device for eliminating high frequency vibrations.

It is another object of this invention to provide a rate-of-change member to motion reaction measuring structure capable of being sensitive to a rate-of-change without being sensitive to extraneous vibrations.

Other objects, purposes and characteristic features will become obvious as the description of this invention progresses.

In accordance with the present invention, a pair of masses is provided on a resilient mounting capable of allowing the masses to be alternately attracted and repelled from each other at a specified frequency.

The vibration of the masses causes the masses to resist in a fluctuating manner any change in rotation of the resilient support for the masses. This varying resistance to rotation is then compared to a reaction member which is resonantly connected to the movable masses and resiliently to a support base member. Any attempt to rotate the reaction member while the movable masses are vibrating causes a proportional vibration or resistance to movement by the movable masses. The resonant vibration between the masses and the reaction member is then detected by a transducer or other detecting device positioned between the movable masses and the reaction member. The magnitude of the oscillating output of the transducer is proportional to the rate-of-change of the angular position supplied to the reaction member and resisted by the vibrating masses.

Similar parts in each of the several views will be designated by like reference characters.

Figure 1:
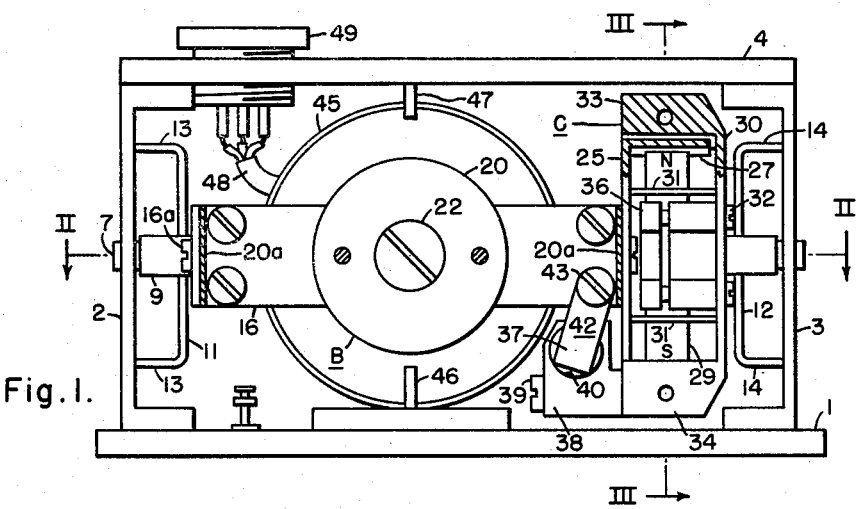
FIGURE 1 is an elevational view of one embodiment of this invention, partly sectioned to better illustrate the reaction member.
Figure 2:
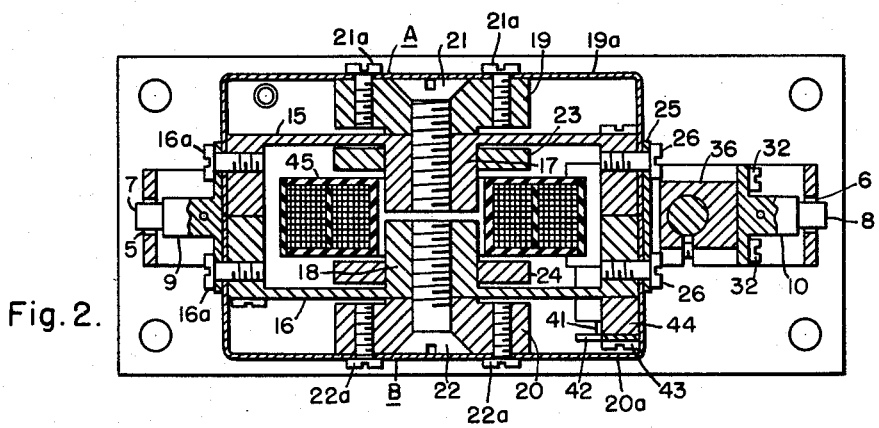
FIG. 2 is a plan view of this invention, taken along the lines II—II of FIG. 1.
Figure 3:
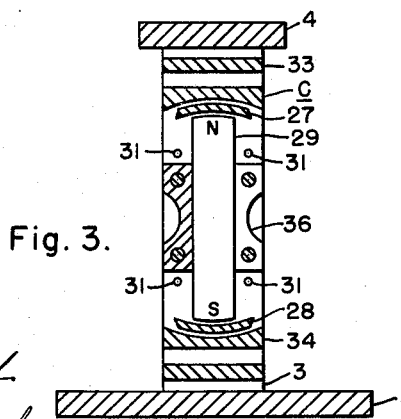
FIG. 3 is a sectional view taken along the line III—III of FIG. 1, showing the structure of the reaction member.

The rate-of-change device of this invention comprises a base member 1 provided with upstanding support members 2 and 3 and a top plate 4. The upstanding supports 2 and 3 are provided with openings 5 and 6 therethrough for receiving outwardly projecting movement limiters 7 and 8, respectively. Each of the movement limiters 7 and 8 is of a diameter less than its respective opening 5 or 6 so as to allow movement of the limiters a restricted amount in all directions. The movement limiters 7 and 8 are provided with integral support portions 9 and 10 having flared end surfaces. The support portions 9 and 10 are provided with supporting resilient spring rods 11 and 12, respectively, passing therethrough and firmly secured thereto. The spring rods 11 and 12 extend upwardly and downwardly as viewed in FIG. 1, with the outer ends turned horizontally as at 13 and 14, respectively, and secured to the end support members 2 and 3, respectively.

The flanged end of the support member 9 is then secured to a pair of resilient members or leaf springs 15 and 16 by suitable screws 16a. The resilient members 15 and 16 are symmetrical with an enlarged mass 17 and 18, respectively, at the center of each of their lengths and securing lugs at each end turned at right angles. With the securing lugs of each reseilient members 15 and 16 placed in opposition and abutting, the central masses 17 and 18 are provided with an air gap therebetween. In addition to the central masses 17 and 18, there is provided additional masses 19 and 20, secured to the central masses 17 and 18, respectively, by the screws 21 and 22 for establishing the desired resonant frequency. The additional masses 19 and 20 are stabilized against twisting motion by the strips 19a and 20a paralleling the resilient members 15 and 16 and secured between the end securing lugs of the resilient members 15 and 16 and the support members 9 and 10. The strips 19a and 20a are secured to the additional masses 19 and 20, respectively, by the screws 21a and 22a respectively. In FIG. 1 the strip 20a is shown broken away to expose certain parts for clarity. Secured to and surrounding the central masses 17 and 18 are copper rings 23 and 24, respectively, providing eddy current damping to be explained hereinafter. The combination of the central masses 17 and 18 with the mass of the outer masses 19 and 20 and the copper rings 23 and 24 combine to make up the desired total masses A and B having a natural mechanical resonant frequency of a desired or selected value. In one particular configuration, this was found to be satisfactory at a resonant frequency of 400 cycles per second.

The ends of the resilient leaf springs 15 and 16 having the abutting right angle support lugs and opposite to those secured to the support portion 9, are secured to an armature or vane 25 (preferably formed of copper) by suitable screws 26. The armature 25 extends upwardly and downwardly from the leaf spring members 15 and 16 and is turned at its ends to form horizontal projections 27 and 28 for cooperating with a permanent magnet 29 for providing damping, to be explained hereinafter. The armature 25 is resiliently connected to a shell type flux return member 30 by four spring rods 31. The shell flux return member 30 is an integral part of the flared end of the support portion 10 previously described. It can be seen that the vibrating masses are now supported by the spring rods 31 and the spring rods 11 and 12 on the upstanding side portions or supports 2 and 3.

The flux return shell 30 is provided with horizontally turned end portions 33 and 34 positioned to cooperative with the horizontally spaced ends 27 and 28, respectively, of the armature 25, with the portions 33 and 34 lying outwardly of the armature portions 27 and 28 and in close proximity therewith.

Positioned within the horizontally turned ends 27 and 28 of the armature 25 is the permament magnet 29 of a length capable of substantially spanning the distance between the horizontally turned ends 27 and 28 of the armature 25. The permanent magnet 29 is supported by a split clamping support member 36 secured to the shell member 30 by screws 32. This assembly comprising the flux shell member 30 and permanent magnet 29 in movable cooperation with the armature 25 forms a reaction member C for measuring rates of changes as explained hereinafter.

The angular inertia of the reaction member C is adjusted to be substantially the same as the inertia of the vibrating masses A and B for establishing a mechanically resonant system not including the base or support. In this way, the base does not form a part of the precessional resonant system thus preventing shock and vibration from affecting the output of the transducer, and also insures that the manner of mounting or restraining the base does not affect the performance. Too sharp a resonance is not desired. This flatness of resonance is obtained from sufficient eddy-current or other type of velocity damping.

Secured to the horizontally turned portion 34 of the shell member 30 is a transducer 37 held by a support member 38. The support member 38 is secured to the horizontal portion 34 by a suitable screw 39 and is provided with a circular horizontal opening 40 of a diameter capable of receiving a suitable transducer 37. The transducer may be of any suitable type, preferably however, it is a commercially available vacuum tube transducer having a mechanically movable plate. It is sufficient to state at this time that the transducer is capable of varying its output by a physical displacement of its plate or anode.

The transducer 37 has a variable anode stem 41 which is operated by a cantilever 42 anchored to one support end of the leaf spring member 16 by a suitable screw 43 and spacer 44. In this way, it can be seen that any relative leaf spring 16 support motion to shell member 30 motion would be detected by the transducer 37.

The centrally positioned masses A and B of the leaf springs 15 and 16 are caused to move alternately inward and outward by an electromagnet 45 secured to the base 1 and top cover 4 by the pins 46 and 47, respectively. The electromagnet 45 has a central opening of a diameter slightly larger than the inwardly projecting central masses 17 and 18 of the leaf springs 15 and 16. The outer diameter of the electromagnet 45 is less than the space between the two support lug ends of the leaf spring members 15 and 16. In this way, the electromagnet 45 does not actually touch any of the vibrating masses or the supporting leaf springs. The movement of the masses A and B is in translation without any rotational movement.

The electromagnet 45 comprises two coils, one of which is supplied with an alternating voltage of a desired frequency, for example, a 400 cycles per second frequency, and the other coil of which is supplied with a polarizing direct-current voltage. With the two coils energized, the electromagnet becomes a polarized electromagnet with the alternating current flux alternately adding or subtracting from the flux set up by the direct-current winding, resulting in the masses A and B being driven in translation at the frequency of the alternating supply current. The electromagnet 45 and the transducer 37 are supplied with operating power, and in addition, the transducer 37 is provided with an output circuit through a cable 48 and a multi-prong connector 49 secured within the top cover 4 of the frame of the vibrating gyroscope. Any suitable connector having an ample number of prongs of any commercially well-known type can be used. An external power supply and gyroscope controlled system are not shown in the interest of simplicity.

Operation of the vibrating gyroscope as a rate-of-change device will now be explained. The base 1 having upstanding portions 2 and 3 is mounted on a vehicle (not shown) in such a manner as to be responsive to angular velocities about its horizontal axis (as shown in FIG. 1) through the support portions 9 and 10. It can be seen that the masses A and B vibrating as a selected frequency, such as 400 cycles per second any attempt to rotate the frame about this axis would cause an alternating precessional (or Coriolis) torque which is opposed by the reaction member C and results in an angular vibration of the shell member 30 with respect to the armature 25 and its attached vibrating masses A and B on the leaf spring members 15 and 16. This angular vibration is then detected by the transducer 37 and utilized in external control circuits, not shown. This motion between the shell member 30 and the armature 25 is damped and thereby limited by the motion of the armature 25 within the magnetic field set up by the permanent magnet 29 and its flux return path through the shell member 30. This damping action tends to reduce any tendency for high frequency oscillations or vibrations to appear in the output of the transducer 37.

With the entire structure of the vibrating masses A and B and the reaction member C comprising the shell 30, permanent magnet 29 and armature 25, being mounted on the spring rods 11 and 12, it can be seen that unusual shocks to the base member 1 causing relative motion between the vibrating masses A and B and the base member 1 would not appear in the output of the transducer 37 or, if appearing, would be greatly reduced. It should be clear, therefore, that only rate-of-change motions causing flexing of the spring rods 31 between the shell 30 and armature 25 of the vibrating masses A and B, can be detected by the transducer 37, and acceleration motions appearing equally on members 25 and 30 are not detected.

The copper rings 23 and 24 placed about the vibrating inwardly projecting central masses 17 and 18, respectively, provide eddy current damping forces which limit the translatory motion of the vibrating masses. This provides additional stability to the operation of the vibrating gyroscope as a whole.

The direction of relative angular displacement can be detected between the reaction member and the vibrating masses by the transducer 37 whether the motion is clockwise or counterclockwise about the horizontal axis of the vibrating gyroscope as shown in FIG. 1, since the phase of the angular precessional vibration is reversed with respect to the translatory vibration (and driving coil supply frequency) when the direction of angular displacement is reversed.

The vibrating gyroscope of this invention has the advantage of being able to eliminate unwanted external or extraneous vibrations from the output of the transducer by providing a reaction member interposed between the vibrating masses and the mounting base.

Since certain changes may be made in the above invention and different embodiments of the invention could be made without departing from hte scope thereof, it is intended that all matter contained in the above description or taken in connection with the accompanying drawing shall be interpreted as illustrative and not in a limiting sense.

I claim as my invention:
1. A device for measuring rate of turning of a craft, comprising a frame adapted to be mounted on such craft, and electrically-driven vibratory mass assemblage including a pair of spaced-apart balanced masses symmetrically positioned about an axis for alternate movement toward and away one with respect to the other, said vibratory mass assemblage having an oscillatory precessional torque reaction to an input turning effort applied thereto, a dead weight rotary reaction mass having a torsionally-resilient rotary connection with said vibratory mass assemblage, transducer means having relatively moving parts carried by said vibratory mass assemblage and said dead weight reaction mass, respectively, responsive to relative rotary movement therebetween to derive an electrical signal proportionate to the degree of such relative rotary movement, and omni-directional resilient shock mount means supportedly connecting said vibratory mass assemblage, said dead weight rotary reaction mass and said transducer means to said frame, said omni-directional resilient shock mount means acting to transmit turning effort from said frame to said vibratory mass assemblage while permitting rotary oscillatory movement of such assemblage, of said dead weight reaction mass and of said transducer means while substantially isolating same from shock forces transmitted to said frame irrespective of the direction of such forces.

2. In a turn rate measuring device, an omni-directionally resilient and torsionally resilient mount for a rotary-precessed vibrational mass assemblage comprising a spring rod means having a first portion for connection intermediate its ends to such mass assemblage and extending in a direction perpendicular to the precession axis thereof, and portions at opposite ends, respectively, extending in a direction parallel to the precession axis for attachment at their projecting ends to a frame member of such device whereby said mass assemblage is isolated with respect to linear and/or angular vibrations in any direction relative to said frame member.

3. In a turn rate measuring device, a vibratory mass assemblage comprising a pair of parallel spaced-apart leaf springs rigidly connected at opposite ends one with the other, a pair of vibratory mass elements attached to said leaf springs, respectively, equidistant opposite ends thereof, and electrical actuator means independently mounted with respect to said assemblage and interposed between said mass elements for effecting vibratory movement thereof one with respect to the other.

4. In a turn rate measuring device, a vibratory mass assemblage comprising a pair of parallel spaced-apart leaf springs rigidly connected at opposite ends one with the other, a pair of vibratory mass elements attached to said leaf springs, respectively, equidistant opposite ends thereof, electromagnet means mounted independently of said assemblage and interposed between said mass elements for effecting vibratory movement thereof one with respect to the other, and eddy current damping elements carried by said mass elements, respectively, adjacent to said electromagnetic means to limit the translatory motion of such elements.

References Cited in the file of this patent
UNITED STATES PATENTS

| | | |
|---|---|---|
| 2,291,612 | Draper | Aug. 4, 1942 |
| 2,455,939 | Meredith | Dec. 14, 1948 |
| 2,627,400 | Lyman et al. | Feb. 3, 1953 |
| 2,753,173 | Barnaby et al. | July 3, 1956 |
| 2,846,207 | Marggraf | Aug. 5, 1958 |

FOREIGN PATENTS

| | | |
|---|---|---|
| 592,099 | Germany | Feb. 1, 1934 |
| 611,011 | Great Britain | Oct. 25, 1948 |